No. 798,924. PATENTED SEPT. 5, 1905.
A. SCHERER.
MANURE SOWING ATTACHMENT TO SEED DRILLS OR CULTIVATORS.
APPLICATION FILED APR. 3, 1905.

2 SHEETS—SHEET 1.

Witnesses
Wm P Hammond
P F Smith

Alfred Scherer Inventor
By his Attorneys
Knight Bros

No. 798,924. PATENTED SEPT. 5, 1905.
A. SCHERER.
MANURE SOWING ATTACHMENT TO SEED DRILLS OR CULTIVATORS.
APPLICATION FILED APR. 3, 1905.
2 SHEETS—SHEET 2.
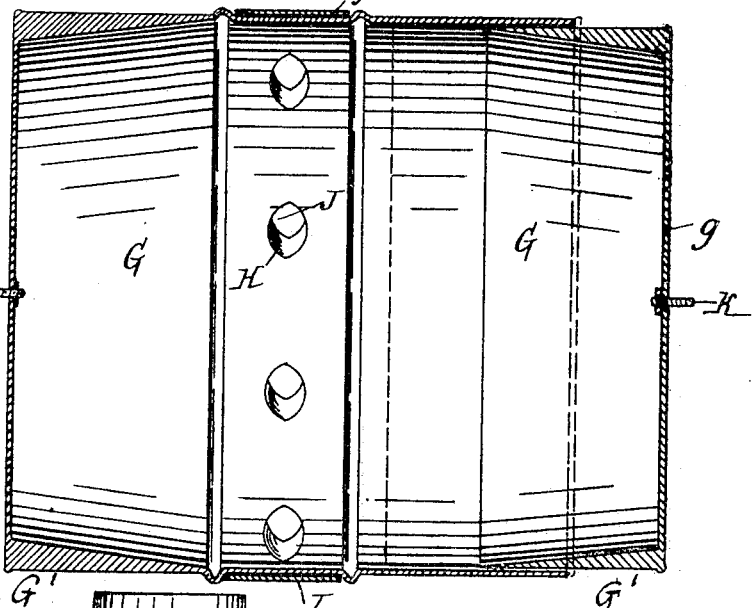
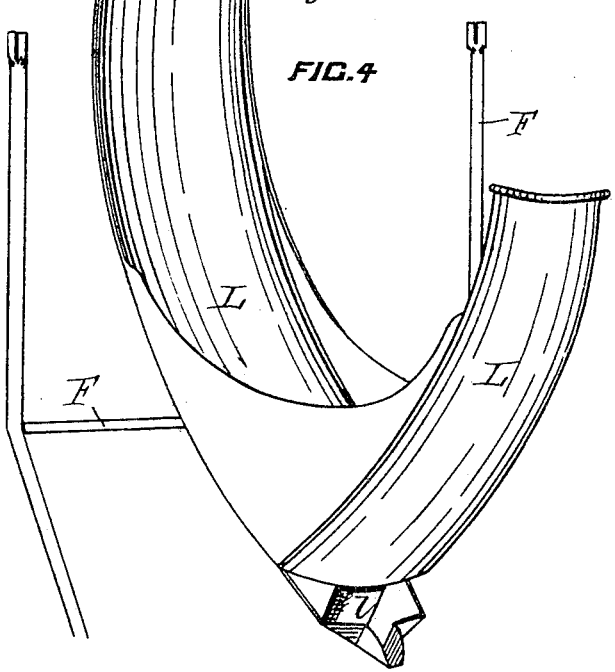

UNITED STATES PATENT OFFICE.

ALFRED SCHERER, OF MANGATOKI, NEW ZEALAND.

MANURE-SOWING ATTACHMENT TO SEED DRILLS OR CULTIVATORS.

No. 798,924.            Specification of Letters Patent.            Patented Sept. 5, 1905.

Application filed April 3, 1905. Serial No. 253,590.

*To all whom it may concern:*

Be it known that I, ALFRED SCHERER, a subject of the King of Great Britain, residing at Mangatoki, in the Province of Taranaki, in the Colony of New Zealand, have invented new and useful Manure-Sowing Attachments to Seed Drills or Cultivators; and I do hereby declare the following to be a full, clear, and exact description of the same.

This invention relates to attachments to seed-drill cultivators by the use of which artificial or other manure may be fed into the drill along with the seed being sown and covered up with the same in the usual manner.

The attachments constituting the invention consist of a drum adapted to hold the manure mounted on a horizontal axis and provided with a series of holes in its side. This drum is supported on a frame attached to the cultivator-frame, so that the periphery of the drum shall form contact with the peripheries of the running-wheels, thereby causing such drum to be revolved on its bearings as the cultivator travels.

A narrow chute or conveyer encircles the lower portion of the drum at a point beneath the holes in its side. This conveyer is formed with a spout-shaped mouth that enters a hole formed in the top of the seed-sower. Manure passing through the holes in the drum will then gravitate down the chute-conveyer and will pass into the seed-conveyer and mingle with the seed fed into it from the seedbox, so as to fall with such seed into the drill.

Figure 1:
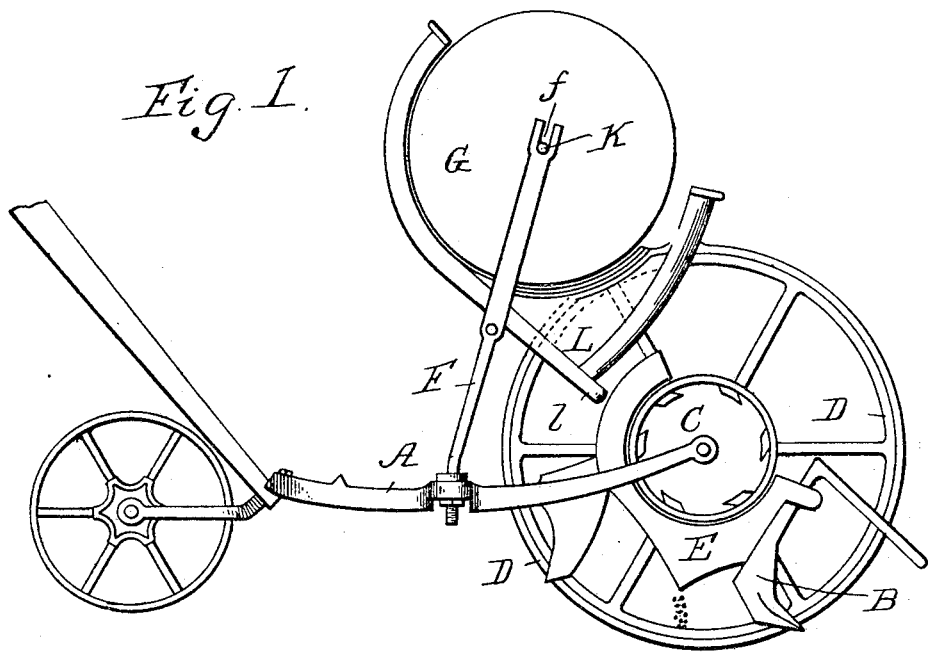
Figure 2:
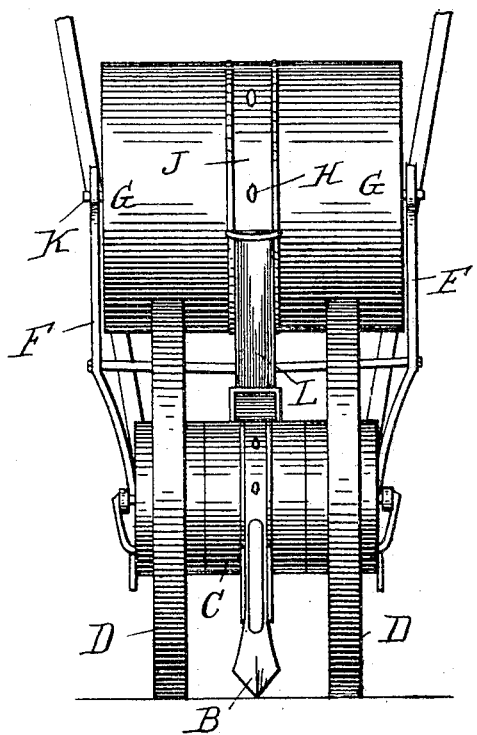

In the accompanying drawings, Figure 1 is a side elevation of the attachments in position upon a seed-sowing cultivator of the Planet, Jr., type. Fig. 2 is a front elevation of the same. Fig. 3 is an enlarged sectional elevation of the manure-drum, showing its construction. Fig. 4 is a perspective elevation, on an enlarged scale, of the manure conveyer or chute.

A is the frame of the cultivator. B is the drill or furrow-opener; C, the seedbox or drum carried by the running-wheels D, and E the seed-conveyer.

F is a forked frame secured to the frame B, the upper extremities of the forked piece being formed with vertical-slot bearings *f*.

G is the manure-drum, which is constructed in the manner shown in Fig. 3. One end of the drum forms a lid *g*, through which it may be filled, the lid being shown as partially withdrawn in full lines and closed down in dotted lines. The drum on the inside near each end is formed with inclined faces G', so as to prevent the manure collecting in the corners and to insure that it shall be fed toward the middle of the drum. The periphery of the drum near the middle is formed with apertures H at intervals in a circumferential line around it. Overlying this portion of the drum is a metal strap J, formed with apertures corresponding to those in the drum. This strap is capable of a sliding motion round the drum, and by it the apertures H may be opened or closed or partially opened, as desired. The ends of the drum are provided with bearing-pins K, which are adapted to fit into the slots *f* of the frame F, and thus support the drum between the forks of the frame, with its periphery in contact with the peripheries of the bearing or running wheels D.

L, Fig. 4, is the chute or conveyer, which is secured to a cross-piece of the frame F and is shaped so as to encircle the lower part of the drum G and to inclose the apertures H between its sides, as shown in Figs. 1 and 2. This conveyer or chute is formed with a mouth portion *l*, opening downward, which enters a hole formed in the top portion of the seed-conveyer E.

In operation as the machine is pushed or drawn along its wheels D, revolving, will cause the drum G to revolve on its bearings, and thus to deliver the manure that has been placed within it through the apertures H into the conveyer L and from it to the seed-conveyer E, into which the seed is also being delivered. The manure and seed will thereby be fed into the drill together.

The amount of manure being sown may be regulated by adjusting the openings H, and, if desired, manure or seed only may be sown.

What I do claim as my invention, and desire to secure by Letters Patent, is—

1. In seed-drill cultivators or the like, a drum adapted to contain manure mounted in horizontal bearings and provided with adjustable apertures in its side at intervals circumferentially around it, and a conveyer or chute surrounding the lower side of the drum, beneath the apertures therein, and formed with a downwardly-extending mouth adapted to enter the top of the seed-conveyer attachment, substantially as specified.

2. In seed-drill cultivators or the like, a drum horizontally mounted in a forked bearing-frame secured upon the cultivator-frame, the periphery of such drum engaging with the peripheries of the running-wheels, adjustable apertures in the side of the drum at intervals circumferentially around it, and a chute or conveyer encircling the lower portion of the drum, beneath the apertures therein, and leading into the seed-conveyer attachment, substantially as specified.

In testimony whereof I have signed this specification in the presence of two subscribing witnesses.

ALFRED SCHERER.

Witnesses:
  TOM WESTON,
  LOUIS J. GRAY.